No. 893,404.

PATENTED JULY 14, 1908.

G. M. WASHINGTON.
JOURNAL BOX.
APPLICATION FILED AUG. 27, 1907.

Witnesses

Inventor
George M. Washington
Edwin L. Yewell
his Attorney

UNITED STATES PATENT OFFICE.

GEORGE M. WASHINGTON, OF HOUSTON, TEXAS.

JOURNAL-BOX.

No. 893,404.

Specification of Letters Patent.

Patented July 14, 1908.

Application filed August 27, 1907. Serial No. 390,315.

*To all whom it may concern:*

Be it known that I, GEORGE M. WASHINGTON, a citizen of the United States, residing at Houston, in the county of Harris and State of Texas, have invented certain new and useful Improvements in Journal-Boxes, of which the following is a specification.

My invention relates to journal boxes, and has for its object to provide certain improvements in the construction of the same as will be hereinafter described and claimed, reference being had to the accompanying drawing, in which:—

Figure 1:
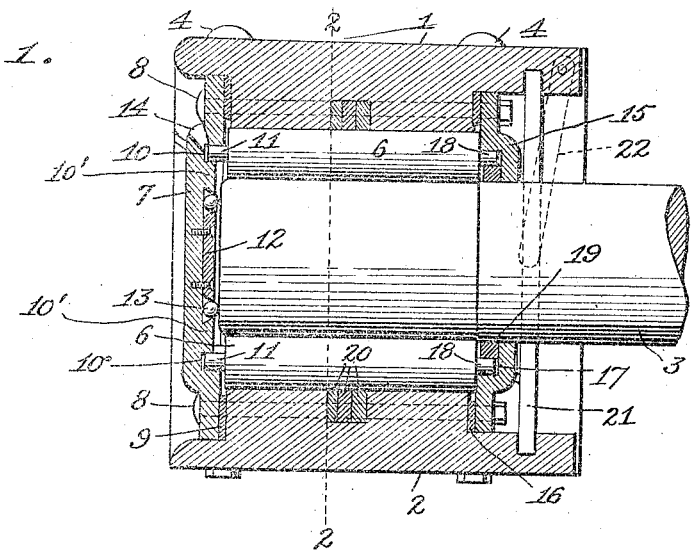
Figure 2:
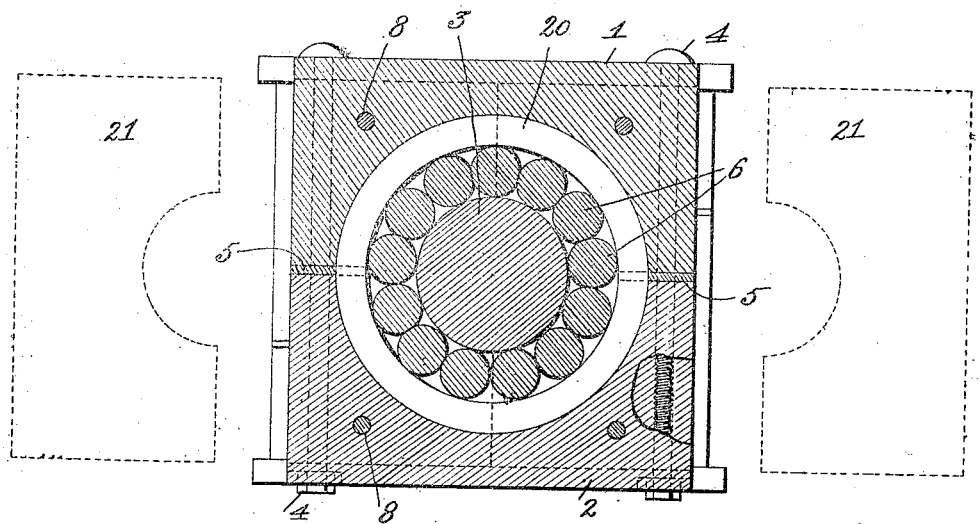
Figures 3, 4:
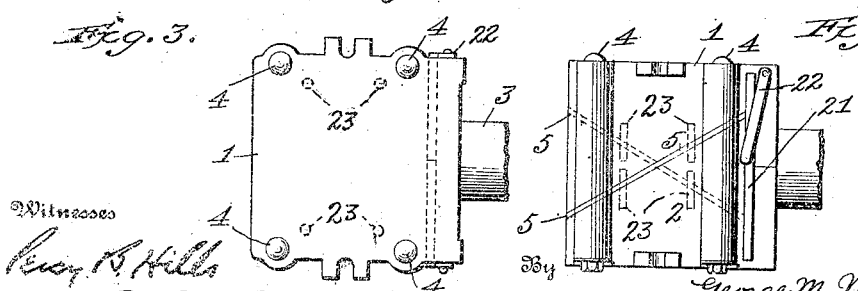

Figure 1 is a vertical sectional view of my improved construction. Fig. 2 is a transverse vertical sectional view on the line 2—2, Fig. 1. Fig. 3 is a top plan view on a reduced scale. Fig. 4 is a side elevation also on a reduced scale.

Similar numerals of reference denote corresponding parts in the several views.

In the said drawing the reference numeral 1, denotes the upper half or section and 2 the lower half or section of the box, the same being formed solid and centrally bored to receive the axle 3, the two sections being permanently united by through bolts 4, a packing 5, being interposed between said sections. The central bore receiving the axle 3 is formed large enough to receive a circular series of anti-friction rollers 6, intermediate said axle and the interior wall of the said bore.

The outer end of the central bore is closed by a plate 7 permanently bolted into position by through bolts 8, a packing 9 being interposed. In the inner surface of said plate is an annular groove 10 receiving the pintles 11 formed on the ends of the rollers 6, while fixed in a central recess in said plate 7 is a retaining plate 12, the edges of said recess and retaining plate being oppositely inclined, as shown, to receive and retain a circular series anti-friction balls 13, against which the end of the axle 3 contacts, thus providing an anti-friction end thrust for said axle. The portion 10' left between groove 10 and the central recess on said plate 7 is in the shape of an annular ring formed integral with said plate 7, and forming a bearing on one side for the rollers 6 and a bearing on its other side for the balls 13. Said plate 7 is also provided with an aperture 14 whereby a lubricant may be supplied to the interior of the box.

The retaining bolts 8 extend completely through the sections 1 and 2 and serve to similarly retain in position a plate 15 on the inner face of the box, between which and the sections 1 and 2 is located a packing 16 similar to packing 9, said plate being centrally apertured to permit the passage of the axle 3 and snugly fitting the same. Said plate is annularly recessed at 17 on its inner face to receive the pintles 18 on the inner ends of rollers 6, an annular packing ring 19, forming the inner bearing for said pintles, and serving to form a tight joint around the axle 3.

In a central annular groove in the sections 1 and 2 is located a series of absorbent rings 20 contacting with the rollers 6 and serving to carry the lubricant around the same.

From the above description it will be seen that I provide in a tightly closed box an anti-friction side and end bearing for the axle, having means for supplying a lubricant thereto in any desired quantity, the rings 20 serving to constantly distribute said lubricant around the roller bearings 6.

If desired I may provide plates 21 sliding in grooves in the sections 1 and 2, and retained in position by spring arms 22, the same serving as a dust guard for the inner closing plate 15.

As shown in Fig. 2, the lower ends of bolts 4 that pass through the lower section 2 are threaded to engage said section and carry lock nuts on their lower ends.

Instead of the sections 1 and 2 being divided on a horizontal line, I prefer to separate them on diagonal lines oppositely disposed on opposite sides, as shown in Fig. 4, whereby any jars thereon will be better equalized and any tendency to displace the parts neutralized. I also prefer to employ a series of dowel pins 23 between the sections 1 and 2 which serve not only to position the sections while being assembled but also aid to retain them in their relative positions.

Having thus described my invention what I claim as new and desire to secure by Letters Patent, is:

1. An axle box, embodying upper and lower solid sections centrally bored, end closing plates for said sections permanently fixed in position, one of which has an annular ring formed thereon, a series of anti-friction rollers disposed longitudinally in said central bore and engaging bearing surfaces in both of said end plates, and a series of anti-friction balls carried on the interior of the end plate formed with said annular ring, said ring forming a bearing on one side for said anti-friction rollers and on its other side for said anti-friction balls.

2. An axle box, embodying a casing centrally bored, a plate permanently closing the outer end of said casing, a plate located at the inner end of said casing and centrally bored, a series of anti-friction rollers disposed in the interior of said casing and having end pintles engaging in an annular groove in said outer closing plate and in a recess in said inner plate, and an annular packing ring in said recess forming the inner bearing for the roller pintles at that end.

In testimony whereof I affix my signature, in presence of two witnesses.

GEORGE M. $\overset{\text{his}}{\times}$ WASHINGTON.
$\quad\quad\quad\quad\quad$ mark Witnesses:
J. J. HARDEWAY,
R. S. CHILDS.